(12) United States Patent
Moss et al.

(10) Patent No.: US 11,740,092 B2
(45) Date of Patent: Aug. 29, 2023

(54) TRAVEL AND ORIENTATION MONITOR APPARATUS FOR FIREFIGHTERS AND RESCUE PERSONNEL

(71) Applicant: POR HOLDINGS LLC, Wilmington, DE (US)

(72) Inventors: Jeffrey Robert Moss, Wilmington, DE (US); Francis W. Rush, III, Wilmington, DE (US)

(73) Assignee: POR Holdings LLC, Wilmington, DE (US)

( * ) Notice: Subject to any disclaimer, the term of this patent is extended or adjusted under 35 U.S.C. 154(b) by 0 days.

(21) Appl. No.: 17/687,957

(22) Filed: Mar. 7, 2022

(65) Prior Publication Data

US 2022/0187077 A1 Jun. 16, 2022

Related U.S. Application Data

(63) Continuation of application No. 16/552,085, filed on Aug. 27, 2019, now abandoned.

(60) Provisional application No. 62/727,712, filed on Sep. 6, 2018.

(51) Int. Cl.
*G01C 21/20* (2006.01)
*A62B 18/08* (2006.01)

(52) U.S. Cl.
CPC ............ *G01C 21/206* (2013.01); *A62B 18/08* (2013.01)

(58) Field of Classification Search
None
See application file for complete search history.

(56) References Cited

U.S. PATENT DOCUMENTS

| | | |
|---|---|---|
| 6,268,798 B1 | 7/2001 | Dymek et al. |
| 7,091,852 B2 | 8/2006 | Mason et al. |
| 7,327,252 B2 | 2/2008 | Goehler |
| 7,633,387 B2 | 12/2009 | Carmichael et al. |
| 8,538,687 B2 | 9/2013 | Plocher et al. |
| 8,599,010 B2 | 12/2013 | Bose et al. |
| 8,599,011 B2 | 12/2013 | Schantz et al. |
| 8,688,375 B2 | 4/2014 | Funk et al. |

(Continued)

FOREIGN PATENT DOCUMENTS

| | | | | |
|---|---|---|---|---|
| EP | 621459 A1 | * | 10/1994 | ............. G01C 17/30 |
| EP | 0621459 A1 | | 10/1994 | |

*Primary Examiner* — James J Lee
*Assistant Examiner* — Andrew Sang Kim
(74) *Attorney, Agent, or Firm* — Kramer Levin Naftalis & Frankel LLP

(57) ABSTRACT

An apparatus carried by an individual for aiding in directing the individual to a location of a starting point for a path of travel by the individual includes a sensor for determining the individual's initial orientation at the starting point and subsequent changes of orientations during the travel; a processor coupled to the sensor for assigning one of four orthogonal (Erections to each of the orientations as experienced by the individual; a memory coupled to the processor for saving at least the orthogonal orientation of the initial orientation and the last experienced orientation; and a display for presenting at least the last experienced orientation to permit the individual to subsequently reorient himself in the direct of the original orientation. The apparatus has particular utility for firefighters to assist in orienting themselves with respect to an initial point of reference (POR) when inside a active firefighting location.

6 Claims, 5 Drawing Sheets

(56) References Cited

U.S. PATENT DOCUMENTS

| | | |
|---|---|---|
| 9,704,378 B2 | 7/2017 | Won |
| 9,829,335 B2 | 11/2017 | Chang et al. |
| 10,420,965 B1* | 9/2019 | Dykes .................... A62B 18/08 |
| 2007/0266575 A1* | 11/2007 | Nash ...................... G01C 17/24 |
| | | 33/355 R |
| 2008/0023002 A1 | 1/2008 | Guelzow et al. |
| 2008/0122696 A1 | 5/2008 | Huseth et al. |
| 2010/0103036 A1 | 4/2010 | Malone et al. |
| 2010/0318293 A1 | 12/2010 | Brush et al. |

\* cited by examiner

TRAVEL AND ORIENTATION MONITOR APPARATUS FOR FIREFIGHTERS AND RESCUE PERSONNEL

CROSS-REFERENCE TO RELATED APPLICATIONS

This application is a continuation of U.S. patent application Ser. No. 16/552,085 filed on Aug. 27, 2019, which claims the benefit from Provisional Application No. 62/727,712, filed on Sep. 6, 2018, the entire content of which is incorporated by reference.

FIELD

The present invention relates to an apparatus and method for monitoring the orientation of an individual with respect to an initial location, with particular applicability for use by rescue personnel, such as firefighters when entering and moving through a building or the like.

BACKGROUND OF THE INVENTION

One of the biggest concerns to the personal safety of firefighters and other rescue personnel is the loss of situational awareness while inside a structure. The buildings are often dark, providing limited forward visibility. Smoke emanating from a fire adds to visibility issues. Firefighters follow walls, flooring and hose lines to orient themselves and maintain a point of reference.

A widely adapted fireground strategy relies on the memory of the firefighter to maintain situational awareness. The sides of the fire building are numbered (or lettered) clockwise, For example, If the building on fire was located on the southwest corner of East 79$^{th}$ Street and 1$^{st}$ Avenue in Manhattan, the front of the fire building located on 79th Street would be labeled as side "1"; the east side of the building that aligns with First Avenue would be labeled as side "2"; the rear yard found in the back (south side) of the building side "3"; and the side that abuts the fire building to the west would be labeled as side "4". As firefighters enter the fire building they would constantly attempt to maintain situational awareness by building a mental model of where their entrance, Side 1, is with relation to their path of travel, retaining side 1 as their point of reference. Given extreme conditions in which the firefighter is acting, it can become difficult for the firefighter to retain the current orientation and position with respect to the point of reference.

It is accordingly a purpose of the present invention to provide a portable apparatus that allows a firefighter or other rescue personnel to enter an initial point of reference into the apparatus, the apparatus subsequently and continuously determining the orientation of the personnel carrying the apparatus with respect to the point of reference, thus freeing the personnel from the task of mentally maintaining orientation awareness with respect the point of reference.

It is a further purpose of the present invention to provide such a portable apparatus which can provide an aural or visual indication of the user's orientation with respect to the point of reference.

Yet another purpose of the invention is to provide such a portable apparatus which allows resetting of the point of reference by the user such that subsequent orientation of the user is monitored and recorded with respect to the reset point of reference.

It is yet a further purpose of the present invention to provide such an apparatus that can be integrated into protective gear worn by the firefighter, such as a self-contained breathing apparatus (SCBA).

BRIEF DESCRIPTION OF THE INVENTION

In accordance with the foregoing and other purposes, the present invention comprises a portable unit able to be worn by a firefighter or other personnel that may be a self-contained unit or incorporated into an article of protective gear or other equipment. The unit comprises circuitry, typically microprocessor-based, to establish an initial point of reference for the unit and continuously monitor the direction of movement of the wearer from the point of reference. Optionally the unit may maintain a continuously-updated record of the orientations as the wearer travels. A display is provided to indicate to the wearer the current orientation of the wearer with respect to the point of reference, or the direction that the firefighter should turn to face the point of reference.

The display may be selectively activated by the wearer, allowing the wearer to receive an indication of his current orientation upon demand. Upon activation, the display indicates information corresponding to the current orientation of the wearer with respect to the point of reference, to allow the user to reorient himself in the direction of the point of reference to facilitate the user's return to the point of reference and his entry point into the building. The display may comprise a series of indicators displays the current orientation of the user needed to start to trace a return path to the point of reference. For example, the display may include a illuminable pair of arrows to indicate the direct in which the user should turn to face the point of departure. Alternatively it may comprise a series of indicators representing four numbered orthogonal directions and the direction that the user is currently facing so that he can reorient himself in the primary direction, which corresponds to the point of entry.

In other embodiments, with the unit keeps a running log of the path of travel from the point of reference, the display may provide a continuing display of a set of turns that the user should make to retrace his exact path to the point of reference. The turns can be displayed sequentially, with an indication that the turn be executed when the location of the user is where he must make the desired turn. As the wearer retraces the path, the unit continuously updates the display to present the next turn, thus allowing the wearer to retrace his original path back to the point of reference.

BRIEF DESCRIPTION OF THE DRAWINGS

A fuller understanding of the present invention will be obtained upon consideration of the following detailed description of the invention when reviewed in association with the annexed drawings, wherein.

DETAILED DESCRIPTION OF THE INVENTION

The present invention comprehends a robust yet simple system for monitoring the travel of a personnel in need of developing a point of reference and the personnel's orientation with respect to that point of reference. As used in the following description, the term "firefighter" is used as a general descriptor for any individual requiring the development of a point of reference and determination of that individual's orientation with respect thereto, with the understanding that the present invention is not limited in usefulness to firefighters.

Figure 1:
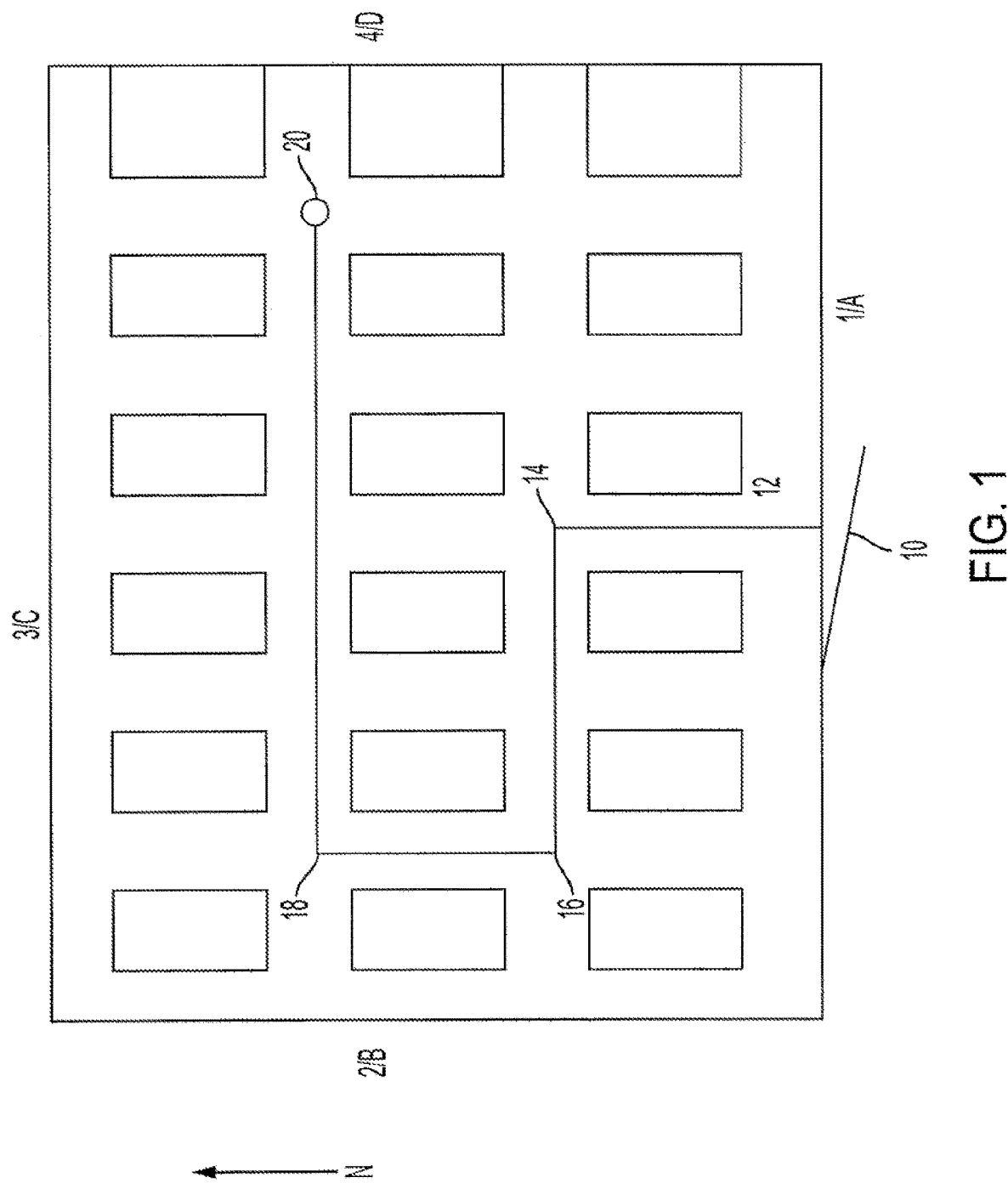
FIG. 1 is an illustration of a hypothetical path of travel for a firefighter within an incident site or building.

FIG. 1 depicts a plan view of an illustrative building having aisles and corridors through which a firefighter must maneuver. The side having entrance 10 for the firefighter is generally referenced as the point of reference 1 or A. As generally understood in the art and as used herein, the term "point of reference" (POR) is the direction which a firefighter faces that points him back towards the side of the building having the entrance through which he came. Typically the POR is associated with the building side having a doorway, but it can also reference, for example, the side having a fire escape or window through which the firefighter entered. From the POR, the remaining sides/directions are consecutively clockwise identified as 2 or B, 3 or C, and 4 or D, the nomenclature generally corresponding to facing directions 90 degrees apart. For example, in FIG. 1, if the entrance doorway is on the south side of the building, the POR corresponds to "south" as the firefighter would need to face south and move in a southerly direction to reach the side through which he entered. As firefighters are trained how to move and maintain a knowledge of their orientation under low visibility and otherwise stressful conditions, the firefighter's knowledge of the POR direction and his current orientation with respect to the POR is typically all he needs to be able to return to the entrance through which he entered.

As a firefighter enters the building and moves along a path 12, the firefighter attempts to maintain a mental record of the direction he is currently facing. Upon entering the building the direction facing (back) to the entrance (South in the Figure) would be remembered as the POR, with his path of travel comprising segment orientations 3/C, then 2/B, followed by 3/C and 4/D, resulting from a left turn at point 14, a right turn at point 16, and another right turn at point 18 with arrival at location 20. Remembering his final 4/D facing orientation with respect to that of the POR allows the firefighter in theory to work his way back to the building side having the portal through which he entered. As may be appreciated, as the firefighter's path of travel becomes more complicated, the ability to retain his proper orientation with respect to the POR becomes more difficult. The presence of smoke, coupled with constant communication and instructions being broadcast and received by the firefighter's radio, along with his attention being primarily focused on his surroundings and the job at hand, often makes POR orientation problematical.

Figure 2:
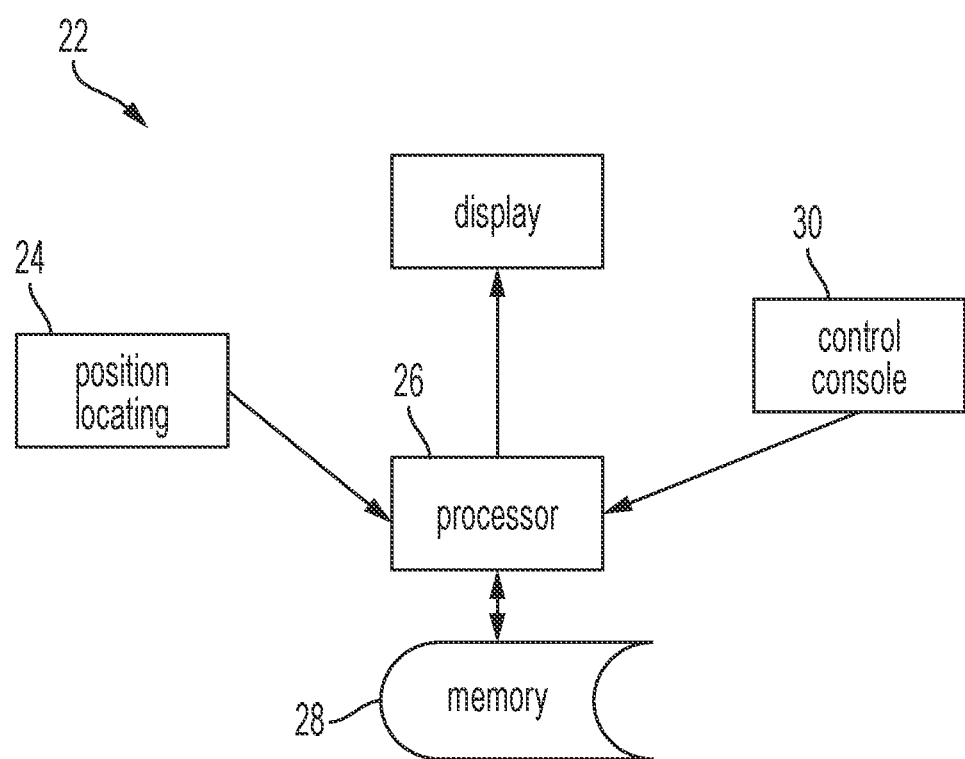
FIG. 2 is a block diagram of the apparatus of the invention.

As illustrated in FIG. 2, apparatus 22 comprises inertial position-locating circuitry 24 which allows the unit to determine the position and direction faced by the firefighter carrying the unit at all times while the apparatus is in operation. Such circuitry may comprise a GPS receiver, and/or attitude and heading reference system components as known in the art. The output of such component(s) is coupled to an appropriate processor 26, typically microprocessor based as known in the art, to receive the initial location and heading data as well as process the path of travel data to determine that the wearer is moving, and thus the direction from the initial location of the unit. Heading and location data may be stored in Memory 28. The processor may include logic to resolve the actual direction of travel into one of four orthogonal directions with reference to the heading or initial direction of travel. The processor also inverts the direction of initial travel to establish the POR direction. In FIG. 1, while the firefighter is initially moving north, the processor establishes the opposite direction, south, as the POR (1/A), as south is the direction which the firefighter must move to return to the building side through which he entered. The three remaining clockwise orthogonal directions, west, north and east in the figure, are respectively assigned the 2/B, 3/C and 4/D designations. Of course, it is recognized that, depending on the actual orientation of the building, the directions need not correspond to the compass direction south, west, north and east. A battery supply (not shown) provides the necessary power for the apparatus. The apparatus may further include a charging port for the battery and a connector (also not shown) to allow programming or updating of the processor. Such features are well known in the art.

In a first embodiment of the invention, the memory 28 need only store the current direction of orientation in addition to the POR. Alternatively, however, the memory may be supplied with, and store, a continuing log of each change of direction. Each change may be recorded as a data point and identified as either a right or left turn from the previous direction to generate a complete record of the orientations of the user as he travels. The distance between data points may also be determined and recorded. If a change in orientation/direction is detected without a corresponding change in location, the direction changes associated with the location can be overwritten such that only the last orientation is retained. With incorporation of appropriate altitude sensors, the apparatus 22 can also be configured to determine and record altitude changes, such as when the firefighter ascends or descends a stairway.

With appropriate position-locating circuitry 24 it may also be possible to record the actual geographical position of each direction change for later recall if desired. In addition, a different degree of resolution of direction changes may be incorporated. Instead of four directions, 90 degrees apart, the apparatus may resolve direction changes into a greater number of segments, such as 45 degrees, although such greater resolution is not presently contemplated.

Control console 30 is provided to provide the appropriate operational commands for the apparatus, including powering-up the apparatus; accepting the apparatus's current position as a POR and commence recordation of travel and direction changes; stopping the recordation process; and potentially entering a playback mode. Entry of such commands may be accomplished through switches or pushbuttons. Logic may be provided to allow a single pushbutton to control various functions, such as by entry of a single press to set a POR and commence recording, two pulses to enter a playback mode, and the like.

To confirm operation of the apparatus and to provide information to the user, display 32 is provided. It may comprise a set of four visual indicators, corresponding to the four possible orientations and be labeled 1/A, 2/B, 3/C and 4/D to assist in identifying their significance. In a first embodiment of the invention, when only the current orientation on the user is stored, the corresponding light would be illuminated as the firefighter travels. As the firefighter knows that indicator 1/A corresponds to the POR and that the indicators are numbered sequentially clockwise from the POR, the firefighter at any time knows both the direction he is facing and its relationship to the POR. When needed, he can use the display to help him determine a return path that will ultimately lead to the POR. As he returns, the display will continue to present his orientation to help him keep on track.

Figure 3:
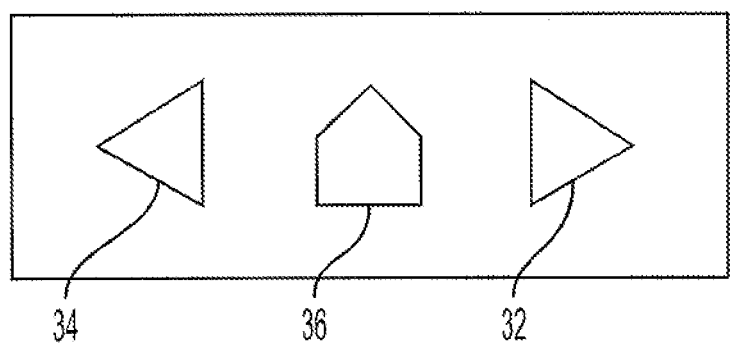
FIG. 3 is an illustration of an alternative form of a visual display.

Alternatively, the display may comprise a pair of directional arrows surrounding a "home" icon, as depicted in FIG. 3. As shown therein, right turn arrow 34 and left turn arrow 36 surround "home" indicator 38. Instead of indicating the current orientation of the firefighter, the display indicates the direction must turn to face the POR. As the firefighter executes a 90 degree turn in the designated direction, the indicators will continue to present the turn direction (if the firefighter was oriented 180 degrees away from the POR) or, when the POR is faced, the central "home indicator 36 will be illuminated. It is to be recognized that the POR can always be faced by continuously turning either right or left, so the apparatus may include logic to indicate the direction that utilizes the fewer 90 degree turns. As with the four indicator version, the display will continue to indicate any needed turns to bring him back to the POR direction as he returns to the POR.

In an alternative embodiment, when a continuous record of travel is maintained, the display may in a playback mode continue to monitor firefighter's current position and provide an indication of the next orientation (a right or left turn) from the firefighter's current opposition to take him back to the POR along the path he originally took to the current location. The necessary logic may need only to reverse the direction changes originally recorded to create a "breadcrumb" return path. The appropriate indicator can flash or blink when the precise location along the original path for the turn is reached. The processor can also generate an error indication when an incorrect turn is executed on the return and generate a corrective turn indication to bring the user back to the proper return path. Such indications can be presented as appropriate on displays 32. With recordation of elevation changes the display can be modified to include, for example, "up" and "down" indicators to indicate which way to go when the apparatus determines that the firefighter has reached a position, such as a stairway, that requires such an elevation change.

A further embodiment may include communication means to allow wireless contact to be made between the apparatus and a remote location, particularly in emergency situations, providing for the transmission of travel record data to the remote location. This would provide other firefighters with directional guidance to the location of the apparatus and its wearer, assisting in rescue efforts. The rescue personnel could be provided with a handheld device displaying the data in a manner that would allow them to retrace the path of the wearer to his current location.

In addition to or as an alternative to a visual display, an aural display system may be utilized. It can include synthesized speech to tell the wearer his current orientation as it changes, as well as the next turn direction when in a return mode. An earphone or speaker can be provided to broadcast the sounds to the wearer. Connection between the apparatus and a radio earphone or speaker carried by the firefighter to avoid a separate transducer may be made by BLUETOOTH™ technology.

The apparatus may be housed in an enclosure that may be worn on a belt, placed in a pocket, or otherwise attached to a piece of clothing. Alternatively, it may be incorporated into a helmet or SCBA. Visual indicators may be located in the faceplate or visor of the helmet so that they can been observed by the wearer but do not impair normal vision, in a further embodiment, the control console, direction sensors and processor may be in a main housing, with the display in a secondary housing interfacing the main housing by a wireless connection such as Bluetooth® technology.

Figure 4:
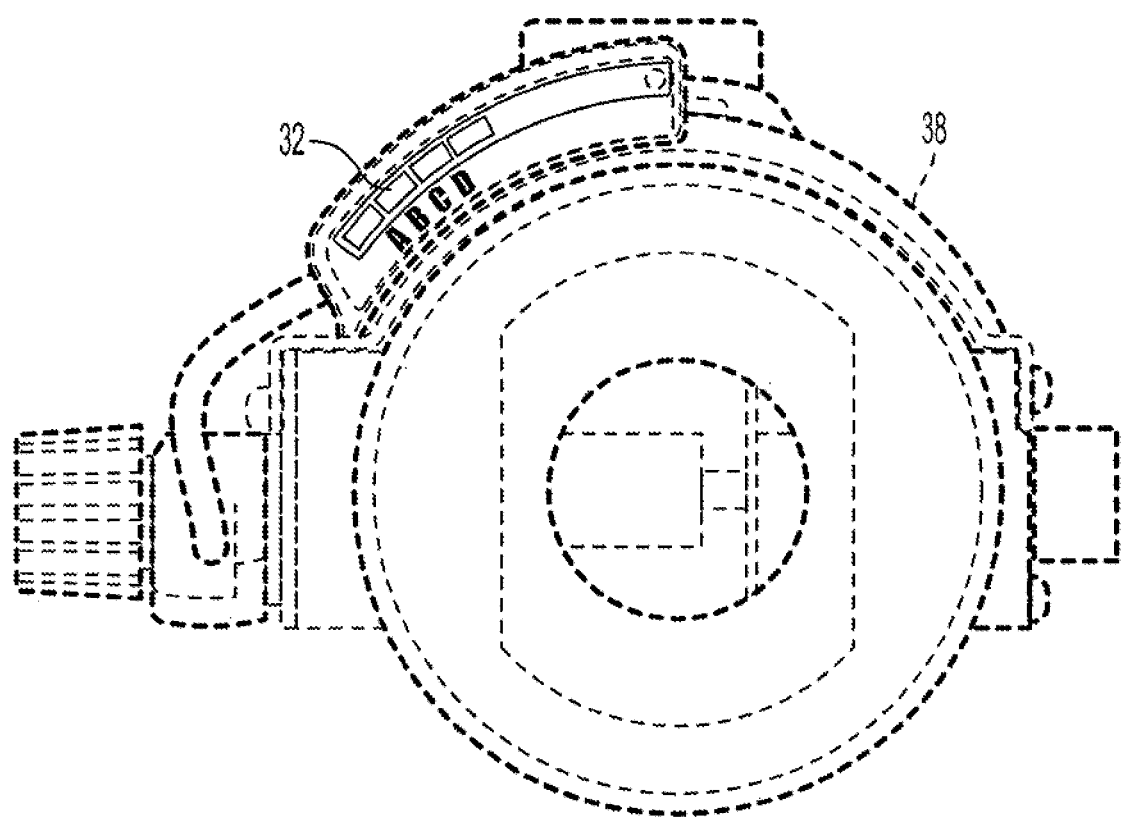
FIG. 4 is an elevation depiction of a representation of a mask of a self-contained breathing apparatus in phantom, illustrating the location of a display of the present invention.
Figure 5:
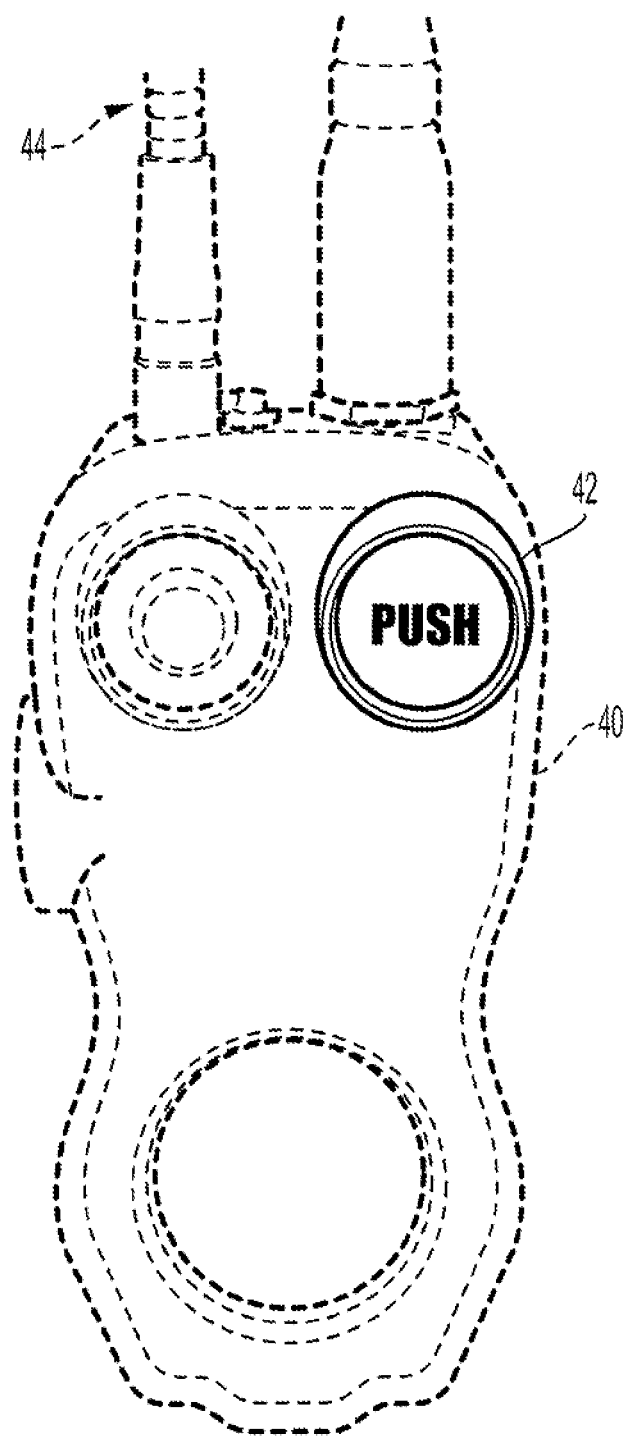
FIG. 5 is an elevation depiction of a remote gauge console for a self-contained breathing apparatus in phantom, illustrating an alternative location for a display of the present invention.

FIGS. 4 and 5 illustrate potential incorporation of the present apparatus with visual indicators into an SCBA. FIG. 4 illustrates display 32, comprising indicators A-D, incorporated into SCBA mask 38. The display is located on a periphery of the mask, facing the wearer, positioned to be towards the edge of the wearer's field of vision. FIG. 5 illustrates SCBA remote control console 40 which additionally incorporates the sensing circuitry 24, processor 26 and memory 28 of the present invention, along with a pushbutton 42 to engage and control the present apparatus. Connection between the processor and display 32 on the mask may be made by wires running along or within the normal conduits 44 between the SCBA console and mask.

Additional functionality may be incorporated into the apparatus. For example, provision may be made for the entry of a second or secondary POR to assist in directing the firefighter to a side (and exit) different from the one originally entered into the system. This can be of value for example, when the command chief wants all firefighters to be aware of a particular POR, such as a side bearing a main entrance into the edifice, irrespective of the specific entry utilized by a firefighter. By use of a particular command entered through the console 30, such a secondary POR can be designated. Entry of a different command entered through the console would direct the processor to use the secondary POR for guidance purposes, and the display 32 would then reflect the substitution. It can be appreciated that additional instruction input means on the console, along with additional indicator means to display the change of "active" POR may be desirable to facilitate entry and confirmation of any such POR change.

We claim:

1. An apparatus carried by an individual for aiding in directing the individual to a location of a starting point for a path of travel by the individual, comprising:
   an inertial position-locating circuitry responsive to movement of the individual, the inertial position-locating circuitry being capable of setting a user-determined initial orientation for the starting point and indicating subsequent changes of orientations of the individual during the path of travel;
   a processor coupled to the inertial position-locating circuitry for assigning a point of reference to a first of four orthogonal directions, wherein the point of reference is 180 degrees opposite of the user-determined initial orientation,
   the processor further assigning the other three orthogonal directions based on subsequent changes of orientation of the individual during the path of travel with respect to the point of reference;
   a memory coupled to the processor for saving at least the the point of reference and a most recent orthogonal direction of the individual; and
   a display for presenting direction indicators to assist the individual to reorient towards the point of reference from the most recent orthogonal direction.

2. The apparatus of claim 1, wherein the user-determined initial orientation of the individual is the direction in which an individual is facing upon entry into a building through an entrance while the point of reference is the direction to exit the building through the entrance.

3. The apparatus of claim 1, further including control means coupled to the processor and the inertial position-locating circuitry, wherein the control means can activate the inertial position-locating circuitry to determine the initial orientation of the individual.

4. The apparatus of claim 1, wherein the four orthogonal directions are identified sequentially in a clockwise direction from the direction of the point of reference, and wherein the display further comprises four indicators corresponding to each of the four orthogonal directions.

5. The apparatus of claim 4, wherein the display further comprises right and left turn indicators, and wherein the processor determines a direction that the individual must turn from the most recent orthogonal direction of the individual to face in the direction of the point of reference, and activates at least one of the right or left turn indicators based on the determined direction of the individual.

6. The apparatus of claim 5, wherein the display further comprises an indicator which corresponds to the direction of the point of reference of the individual and wherein the processor activates that indicator when the individual is facing the direction of the point of reference.

\* \* \* \* \*